E. C. BERNHEIM.
EYEGLASSES.
APPLICATION FILED OCT. 9, 1917.
1,347,072.  Patented July 20, 1920.
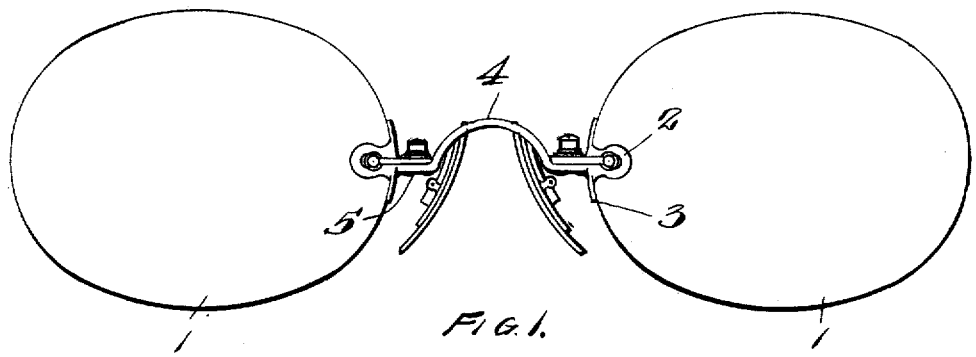
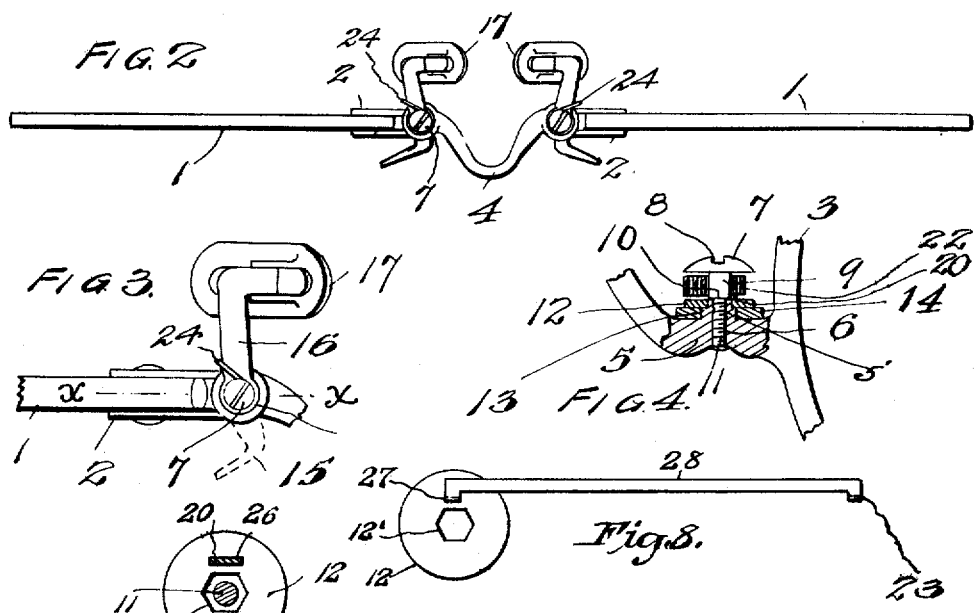
INVENTOR
Eugene C. Bernheim
By
ATTORNEY

UNITED STATES PATENT OFFICE.

EUGENE C. BERNHEIM, OF SOUTHBRIDGE, MASSACHUSETTS.

EYEGLASSES.

1,347,072.   Specification of Letters Patent.   Patented July 20, 1920.

Application filed October 9, 1917. Serial No. 195,603.

*To all whom it may concern:*

Be it known that I, EUGENE C. BERNHEIM, a citizen of the United States, residing at Southbridge, in the county of Worcester and State of Massachusetts, have invented certain new and useful Improvements in Eyeglasses, of which the following is a specification.

My invention relates to improvements in eyeglasses, and such improvements are particularly directed to and applicable to what are known as finger-piece or finger-lever mountings.

This invention aims to overcome many of the serious objections and defects found to exist in eyeglasses in general use, and among the objects of the invention are the provision of a mounting which will be of attractive and ornamental appearance; which will permit of ready application and removal of parts for purposes of repair; which will allow of instant adjustment of the springs to suit the convenience of the wearer; and which adjustment or regulation may be made by any person skilled in the art; which will be of the simplest, cheapest and most durable construction; which will positively retain the eyeglasses in position under all conditions and which generally will meet all the requirements of the public and prove highly efficient and practical from every point of view.

With these objects in view, my invention consists of an eyeglass embodying novel features of construction and combination of parts, substantially as disclosed herein.

In order that the details of construction and the operation of my improvements may be fully understood and the many advantages which result from my invention may be fully appreciated, I have illustrated in the accompanying drawings eyeglasses constructed in accordance with and embodying my invention, and to which I invite attention.

Figure 1 is a front elevation of a pair of eyeglasses equipped with my improvements.

Fig. 2 is a top plan view thereof.

Fig. 3 is a top plan view on an enlarged scale of a part of the mounting to more clearly show details of construction.

Fig. 4 is a sectional view on line X—X of Fig. 3, showing particularly the relation of the raised tubular bearings, lever, spring, locking washer for the spring, and the novel securing means or screws.

Fig. 5 is an enlarged view in horizontal section showing in plan view a washer which is adapted to retain a finger lever in place upon its pivot and also showing in cross section the anchoring portion of a spring secured to said washer, and also in cross section the screw bolt for retaining the washer and spring in position;

Fig. 6 is an enlarged top plan view of the washer with the coiled spring for actuating a nose grip supporting lever;

Fig. 7 is a sectional view showing a modified form of the raised tubular bearing, the washer and spring, the coils of the spring in this form of my invention being disposed one upon the other or in horizontal relation instead of in a vertical position, and Fig. 8 is an enlarged plan view of the locking washer used in connection with the horizontally disposed spring, the said spring being shown in extended, uncoiled condition.

Referring to the drawings, in which similar numerals of reference denote corresponding parts in all the views of the drawings:—

The numeral 1 designates the lenses to which are secured by suitable fastenings the ears 2 formed with the straps 3, resting snugly against the edges of the lenses, and the straps are connected by the nose bow or bridge 4, formed adjacent the straps with the horizontally disposed flat portions or platforms 5, each platform being formed with a raised projection forming a bearing or pivot 5' for pivotally supporting the nose grip supporting levers as will hereinafter be described. Threaded openings 6 are provided which extend through the said projections, the purpose of which openings will be pointed out later on. The diameter of the lower portion of each of the projections in the form of construction shown in Figs. 1 to 6, inclusive, is considerably greater than that of the upper portion thereof, as is shown in the said figures, particularly Fig. 4, the said lower and upper portions being separated by shoulders. The reduced upper portions of said projections are hexagonal in transverse section.

In assembling and securing the parts of a pair of eyeglasses embodying my invention in position, I employ a novel construction of securing screw which is formed with a comparatively large head 7 having a kerf or slot 8 to receive a screw driver or like implement, with the intermediate body portion 9 thereof around which the coils of the springs for actuating the nose grip supporting levers are disposed, and with the angular shoulder 10 which bears against the upper end of the upwardly extending projection 5'. The reduced threaded shank or stem portions 11 of the securing screws engage the threaded openings 6 which extend through the said projections and through the opposite ends of the bow or bridge spring or other connection between the lenses of a pair of eyeglasses.

Washers 12 are provided which have hexagonal openings 12' through which the reduced hexagonal upper end portions of the projections 5' extend. It is apparent that these washers may be adjusted to various positions upon these projections.

14, 15 and 16 designate the central, front and rear portions respectively of the nose grip supporting levers which levers are provided with openings 13 through which the projections 5' extend. These levers are pivoted upon the lower larger portions of these projections, as is clearly shown in Fig. 4 of the drawing. The springs 21 are provided at their inner ends with depending projections 20 which are secured in slots or openings 26 in the said washers 12. These springs are coiled as indicated in Fig. 6 of the drawing and their outer ends are provided with depending projections 23 which are adapted to contact with the rearward extending portions 16 of the nose grip supporting levers, as indicated at 24.

In the construction shown in Figs. 7 and 8, the washer 12 is identical with the same part shown in the preceding figures of the drawing and is provided with a similar central, hexagonal opening 12'. The said washer likewise is provided with a hole or opening extending therethrough adjacent the hexagonal opening and in which is secured a projection 27 from the spring 28. The projection 27, as indicated in Fig. 8 of the drawing, extends at right angles to the plane of the spring 28 so that when the latter is coiled the coils thereof occupy positions one above the other, as indicated in Fig. 7 of the drawing. The outer end of the spring 28 is provided with a projection 23 extending at right angles to the plane thereof, as is indicated in Fig. 8 of the drawing, which projection is adapted to engage the rear portion 16 of the nose grip supporting levers for the purpose of holding the same inwardly in position to grip the nose of a wearer.

As shown in Fig. 7 of the drawing, the upper end portions of the projection 5' are hexagonal in cross section but said portions are not separated from the lower cylindrical portions by shoulders as is the case in Figs. 1 to 6 inclusive.

From the foregoing description, taken in connection with the drawings, the operation of my improvements will be readily understood, and it will be evident that the tension of the springs upon the inner ends of the finger levers presses the pads against the nose to retain the eyeglasses in proper position, and to apply or remove the eyeglasses, it is only necessary to apply pressure to the finger pieces or grasping portions of said levers to move the levers and release the pads.

It will also be observed that the heads of the screws entirely cover and protect the springs and prevent contact with the springs or the entrance of dirt or foreign matter.

It will also be apparent that the tension of the springs may be regulated or adjusted by turning the disks or washers to change the coils of the springs, and that such adjustment may be accomplished instantly by any person skilled in the art.

It will also be evident that in the event of breakage of the spring that a new one may be supplied at a very small cost and be quickly placed in position.

It will also be noted that the improvements will cause the eyeglasses to fit the nose of the wearer perfectly, but at the same time will not become dislodged by striking by a puff of wind or by perspiration upon the nose.

Also my improvements may be used in connection with eyeglass mountings of the lever type which employ round coil springs in general use, and thus add greatly to the efficiency of such glasses.

In general, it will be seen that my improvements are designed to meet the requirements of the trade and public, and that they produce eyeglasses of ornamental and attractive appearance which can be produced at the proper price; which possess the necessary strength and durability; which will fit the nose comfortably and securely; which permit of adjustment or regulation of the tension of the springs; which can be easily and quickly repaired or adjusted; which protect the springs against undue wear and the entrance of dirt or foreign matter; which will permit of the removal or application of parts when necessary by any skilled optician or mechanic; and which in every particular will prove entirely efficient and practical.

I claim:—

1. In an eyeglass, the combination of the lenses, bridge and pivoted finger levers, washers having an adjustable locking connection on the pivots of said levers, and springs mounted upon said washers and coiled concentrically of the axis of the pivots and having their free ends engaging the finger levers.

2. In an eyeglass, the combination of the lenses, bridge and pivoted finger levers, washers having an adjustable locking connection on the pivots of said levers, and springs mounted upon said washers and coiled concentrically of the axis of the pivots and having their free ends engaging the finger levers, and screws having connection with said pivots and having their heads bearing above and concealing the coils of the springs.

3. An eyeglass mounting, comprising a bridge having projections adjacent its opposite ends and also having screw threaded openings extending through the said opposite ends and through the said projections and the upper end portions of said projections being reduced and being angular in cross section, nose grip supporting levers pivoted upon the lower portions of the said projections, washers having adjustable connection with the said reduced end portions, and springs for actuating the said levers, said springs respectively being anchored at one end in one of the said washers and the opposite ends thereof being in contact with the rear portions of the said levers.

4. An eyeglass mounting, comprising a bridge having connection at its opposite ends to lenses, said bridge being provided with upwardly extending projections adjacent its opposite ends and having screw threaded openings extending therethrough and through the said projections and the said projections each having their upper ends reduced and separated from the lower, larger portions by a shoulder, nose grip supporting levers pivoted upon the lower, larger portions of said projections, washers adjustably connected with the upper reduced end portions of the said projections, springs coiled concentrically of the said projections, said springs respectively being anchored to the said washers and also being in engagement with the rearward portions of the said levers, and retaining screws for engagement with the said screw threaded openings, said screws having heads situated above the said springs.

5. An eyeglass mounting, comprising a bridge having connection at its opposite ends with lenses, said bridge being provided with flattened portions adjacent said ends and also having projections situated within the said flattened portions, said projections each comprising a lower cylindrical portion and an upper reduced portion, angular in cross section, nose grip supporting levers pivotally mounted upon the said cylindrical portions, washers in engagement with the said reduced portions, headed screws having engagement with screw threaded openings in the said projections, and springs anchored in the said washers and coiled around the said screws and retained in position thereon by the said heads, substantially as described.

6. An eyeglass mounting comprising a bridge having connection at its opposite ends with lenses, said bridge having projections adjacent its opposite ends which projections extend in the plane of the said lenses, nose grip supporting levers pivoted upon the said projections, washers having adjustable connection with the said projections, said washers being adapted to retain the said levers in positions upon the said projections, coiled springs respectively having connection at one end with a washer and at their other ends contacting with the rearward portions of the said levers for actuating the same, and means for retaining the said springs and washers in position upon the said projections.

In testimony whereof I affix my signature in the presence of two witnesses.

EUGENE C. BERNHEIM.

Witnesses:
MARY E. SMOOT,
WM. N. MOORE.